United States Patent [19]
Langstroth

[11] Patent Number: 5,133,314
[45] Date of Patent: Jul. 28, 1992

[54] LINKAGE ARMS FOR MINIMIZING PISTON WOBBLE

[76] Inventor: Steven W. Langstroth, 500 S. Carmichael Ave. #332 D, Sierra Vista, Ariz. 85635

[21] Appl. No.: 811,672

[22] Filed: Dec. 23, 1991

[51] Int. Cl.[5] .......................... F02B 75/32
[52] U.S. Cl. ............................ 123/197.1
[58] Field of Search .............. 123/197.1, 197.4; 92/140

[56] References Cited

U.S. PATENT DOCUMENTS

| | | | |
|---|---|---|---|
| 455,029 | 6/1891 | Westinghouse | 92/189 |
| 760,333 | 5/1904 | Hardenbrook et al. | 123/90.14 |
| 1,213,315 | 1/1917 | Well | 123/21 |
| 1,651,330 | 11/1927 | Holmes | 74/44 |
| 1,655,338 | 1/1928 | Roe | 123/197.1 |
| 2,029,169 | 1/1936 | Hironaka | 92/140 |
| 2,395,911 | 3/1946 | Schoenfeld | 92/187 |
| 4,807,577 | 2/1989 | Koutsoupidis | 123/197.4 |

FOREIGN PATENT DOCUMENTS

| | | |
|---|---|---|
| 2911888 | 10/1979 | Fed. Rep. of Germany . |
| 3326467 | 1/1985 | Fed. Rep. of Germany . |
| 555308 | 6/1923 | France . |
| 7980 | of 1894 | United Kingdom . |
| 693427 | 7/1953 | United Kingdom . |

*Primary Examiner*—David A. Okonsky
*Attorney, Agent, or Firm*—Cahill, Sutton & Thomas

[57] ABSTRACT

In an internal combustion engine, a piston is prevented from wobbling about its wrist pin by including parallel linkage arms between the piston and a follower gear on the crankpin of the connecting rod. The follower gear orbits a stationary gear, but does not rotate. The follower gear is coupled to the stationary gear by intermediate gears. The stationary gear is coupled to the engine block so that it does not rotate about the main journal of the crankshaft. Rotation of the follower gear is prevented by choosing gear ratios such that their product is one half. In an alternative embodiment, the linkage arms between the follower gear and the piston comprise shafts with a bevel pinion gear at each end. One end engages the follower gear while the other end engages a sector gear concentric with the wrist pin.

11 Claims, 2 Drawing Sheets

LINKAGE ARMS FOR MINIMIZING PISTON WOBBLE

BACKGROUND OF THE INVENTION

This invention relates to reciprocating internal combustion engines and, in particular, to linkage arms connecting a piston to a crankshaft, in addition to the connecting rod, for preventing the piston from wobbling within its cylinder.

As known in the prior art, an internal combustion engine comprises one or more right circular cylinders each containing a piston closely fitting but movable within the cylinder. One end of the cylinder is closed, forming a combustion chamber. The piston typically has several resilient rings in parallel grooves about its circumference for providing a gas-tight, sliding seal between the closed, upper portion of the cylinder and the lower portion of the cylinder. The piston is typically hollow to reduce the mass thereof, resembling an inverted cup. The lower end of the cup is called the skirt of the piston. A wrist pin extends across the diameter of the skirt. Work is obtained from the piston by means of a rotating crankshaft and a connecting rod joining the crankshaft to the wrist pin In operation, the crankshaft rotates and the connecting rod oscillates about the wrist pin in a pendulum motion. Because of viscous forces, there is a small but finite moment exerted on the piston by the connecting rod and wrist pin, tending to rotate the piston about the axis of the wrist pin. This wobble or rocking of the piston can cause significantly increased wear of the cylinder because the square edges of the rings, and of the piston itself, engage the sparsely lubricated upper end of the cylinder and act as a chisel, causing what is known as adhesive wear.

This wear causes the cylinder to become out of true and out of round. That is, the cylinder is no longer a right circular cylinder but the frustrum of a cone with the larger opening away from the crankshaft. A cross section of the cylinder is no longer circular but oval or elliptical with the minor axis of the ellipse parallel to the axis of the wrist pin. This wear pattern is characteristic of wobble or rocking about the axis of the wrist pin and is in addition to the normal wear of the rings on the wall of the cylinder. This out of roundness and taper is a major cause of the loss of the gas tight seal across the rings. In an internal combustion engine, this causes loss of compression (and loss of power) and burning of oil vapor drawn into the cylinder from the crankcase.

In automobile engines, whether gasoline fueled or diesel, the wear is tolerated to the extent that the time it takes for the wear to become a problem exceeds the typical lifetime of the vehicle. For trucks, locomotives, marine or fixed engines, this is not the case at all. The wear from the wobble of the piston reduces the time between overhauls of the engine. The time and cost of an overhaul are considerable. Thus, it is highly desirable to increase the time between such services. Further, on some engines, the distortion of the cylinder requires installation of new sleeve inserts for each cylinder in order to render the cylinder true and round. On other engines, material must be removed from the cylinder, in addition to what had been worn away, in order to correct the cylinder. This reduces the number of times that such engines can be overhauled. In both cases, the overhaul is expensive.

There are two basic solutions in the prior art to the problem of piston wobble or rocking. One solution is to lengthen the skirt of the piston. By using a longer piston, one obtains a more stable piston. However, a longer skirt decreases the arc through which the connecting rod can oscillate, requiring either a shorter stroke on the crankshaft or a longer connecting rod; the latter greatly increasing the size of the engine. A longer skirt also increases fluid dynamic drag and increases power loss.

The second solution is a carryover from the days of steam engines in which a crosshead member was interposed between the working piston and the crankshaft. The working piston and the crosshead member were connected by a shaft passing through a bearing which sealed the cylinder. In U.S. Pat. No. 2,395,911, a stabilizing shaft extends downwardly from the piston and engages a bearing supported by a crossmember. A split connecting rod straddles the stabilizing shaft, connecting the wrist pin with the crankshaft. While reducing piston wobble, this approach requires a considerably larger crankcase, which may not be acceptable.

In view of the foregoing, it is therefore an object of the invention to provide an improved means for stabilizing a piston within a cylinder.

Another object of the invention is to increase the service life of internal combustion engines.

A further object of the invention is to minimize distortion of the cylinder due to wear.

Another object of the invention is to increase the number of times that an engine can be overhauled.

SUMMARY OF THE INVENTION

The foregoing objects are achieved in the invention wherein a gear set connected to the crankshaft is connected to the piston by linkage arms to maintain the axis of the piston parallel to the axis of the cylinder within which it slides. Specifically, a non-rotating or fixed gear is concentric with the axis of the crankshaft. A follower gear is concentric with the crankpin of the crankshaft and turns on the crankpin. One or more intermediate gears, mounted on the crank arm, couple the fixed gear to the follower gear. The intermediate gears rotate and orbit around the fixed gear. A coupling member is attached to the follower gear for receiving the linkage arms, one on each side of the connecting rod. The linkage arms extend the length of the connecting rod and are fastened at their other ends to the inside of the piston, one on each side of the wrist pin. The gear ratios are such that the follower gear orbits the fixed gear but does not rotate. Because it is attached to follower gear by the coupling member and the linkage arms, the piston does not rotate about the wrist pin.

In accordance with another aspect of the invention, the linkage arms comprise shafts having a pinion gear at each end. At the crank end, a first pinion gear engages the follower gear. At the piston end, the other pinion gear engages a sector gear on the inside of the skirt of the piston. As the crank rotates, the motion of the connecting rod relative to the piston is compensated exactly by the motion of the rotating linkage arms.

BRIEF DESCRIPTION OF THE DRAWINGS

A more complete understanding of the present invention can be obtained by considering the following detailed description in conjunction with the accompanying drawings in which.

DETAILED DESCRIPTION

Figure 1:
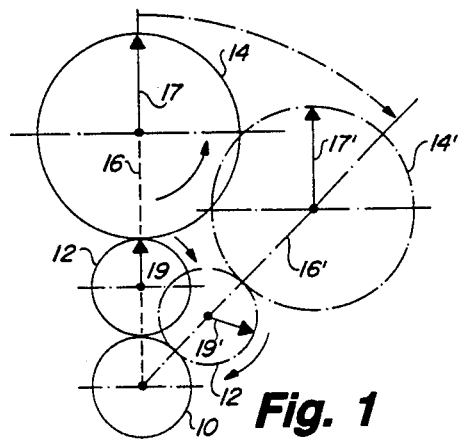
FIG. 1 illustrates the operation of the fixed, intermediate, and follower gears.

FIG. 1 illustrates schematically the operation of the gears in accordance with the invention. Gear 10 is fixed, i.e. it does not rotate. Positioned above gear 10 is intermediate gear 12 which engages or meshes with gear 10. Intermediate gear 12 is free to rotate and to orbit about fixed gear 10. Follower gear 14 engages intermediate gear 12 and orbits about fixed gear 10. Suitable means, represented by line 16, keeps the centers of gears 10, 12 and 14 aligned.

Means 16 rotates about one end which is located at the center of gear 10. As means 16 rotates, intermediate gear rotates and orbits about fixed gear 10. As intermediate gear 12 rotates, it causes follower gear 14 to rotate and to orbit gear 10. However, if the ratios of the gears are chosen correctly, follower gear 14 will orbit but not rotate. Specifically, the product of all the gear ratios, taken in sequence, must equal one half. That is, the ratio of fixed gear 10 to intermediate gear 12 multiplied by the ratio of intermediate gear 12 to follower gear 14 must equal one half.

There can be more than one intermediate gear. If none of the intermediate gears turns on a common axis, there must be an odd number of intermediate gears to apply torque in the correct direction to counteract the torque from the wrist pin. If two intermediate gears turn together on the same axis rather than mesh, then the fixed gear need not be one half of the diameter of the follower gear, so long as the product of the gear ratios is one half. In either case, the result, as indicated by arrows 17' and 19', is that follower gear 14 does not rotate as it orbits around fixed gear 10.

In the invention, fixed gear 10 is concentric with the axis of the crankshaft and is prevented from rotating by being coupled to the engine block (not shown). Means 16 comprises the crank arm of the crankshaft, to which intermediate gear 12 is attached. Follower gear 14 is concentric with the crankpin, which turns within follower gear 14.

Figure 2:
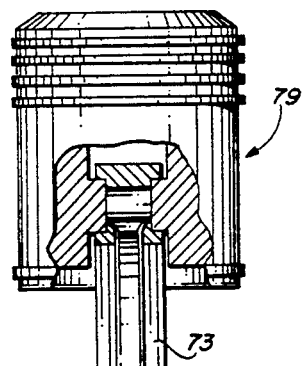
FIG. 2 illustrates a side view of a piston assembly constructed in accordance with the invention.
Figure 3:
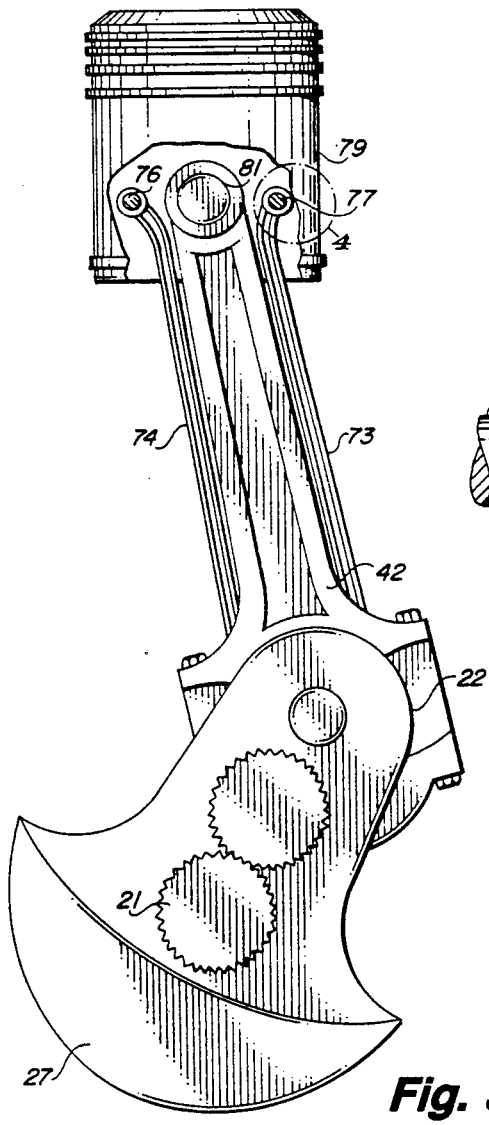
FIG. 3 illustrates an end view of the piston assembly shown in FIG. 2.

FIGS. 2 and 3 show side and end views, respectively, of a piston assembly constructed in accordance with a preferred embodiment of the present invention. Crankshaft 20 has a segmented journal 21, crank arms 22 and 23, and crankpin 24. At the opposite ends of crank arms 22 and 23 from crankpin 4 are counterweights 26 and 27, respectively. Surrounding journal 21 are main bearings 31 and 32. Fixed gear 33 is attached to main bearing 32. Key 34 fits in a groove in the outer surface of bearing 32 and engages a corresponding groove in the engine block and a notch in gear 33. Thus, bearing 32 and gear 33 do not rotate.

Intermediate gears 35 and 37 are mounted on common shaft 38 which passes through bore 39 in crank arm 23. Crankpin 24 is press fit or bolted within bores in crank arms 22 and 23. Follower gear 41 and connecting rod 42 are mounted on crankpin 24, which turns within these members. Connecting rod 42 has a split or forked lower end for clearing the linkage arms. The teeth on gear 41 engage the teeth on intermediate gear 37. The ratios of the gears are chosen such that their product is one half. For the reasons given in connection with FIG. 1, follower gear 41 orbits fixed gear 33 but does not rotate as the crankshaft rotates.

Figure 5:
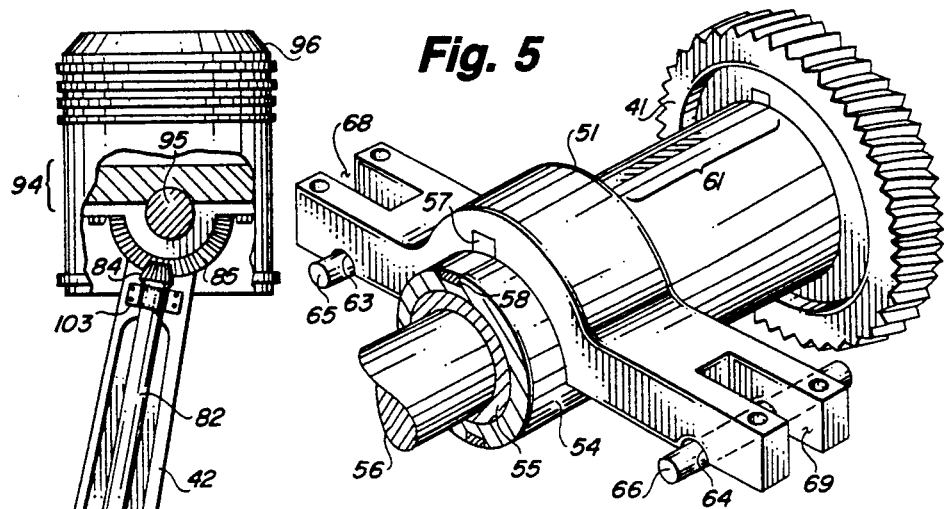
FIG. 5 shows the connection between the linkage arms and the follower gear.

FIG. 5 illustrates in greater detail the connection between the linkage arms to the follower gear. Upper clamp 51 (and lower clamp 52, not shown in FIG. 5) fit around sleeve 54, which surrounds crank bearing 55 on crankpin 56. Follower gear 41 is connected to the upper and lower clamps by sleeve 54. Although, theoretically, the clamps and the follower gear could frictionally engage the sleeve, a more positive connection is needed. To provide this more positive connection, key 57 fits within longitudinal groove 58 in the upper surface of sleeve 54 and extends from clamp 51 to follower gear 41. Key 57 preferably comprises a reduced height portion in region 61 where it is only as thick as groove 58 is deep. This provides clearance for the end of connecting rod 42 and cap 71. A similar connection is provided for lower clamp 52. Alternatively, two separate keys in either a single long groove or in two separate grooves can be used. In either case, clamps 51 and 52 are connected to follower gear 41 via sleeve 54 and, thus, are kept in rotational alignment with respect to the engine block.

Upper clamp 51 includes detents 63 and 64 for receiving link pins 65 and 66, respectively. Link pins 65 and 66 span cutouts 68 and 69 at each end of upper clamp 51. Slots 68 and 69 provide clearance for linkage arms 73 and 74 (FIG. 3) which are mounted on pins 65 and 66 and held in place by clamp means 51 and 52.

Figure 4:
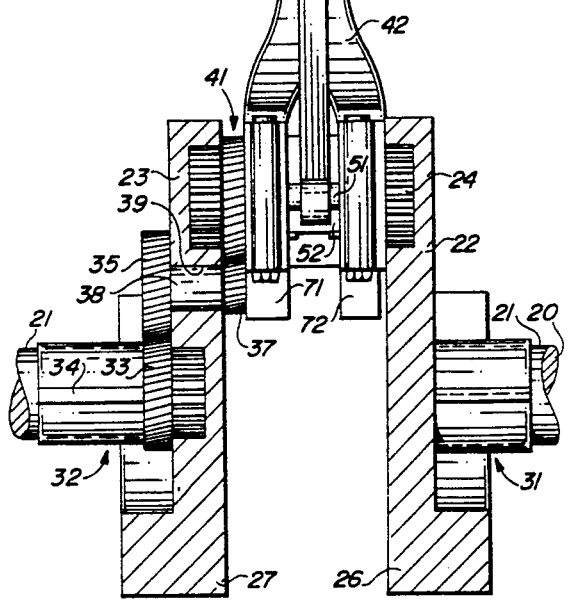
FIG. 4 shows a detail of a linkage arm from FIG. 3.
Figure 4:
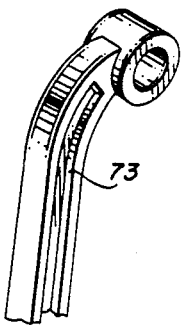

Similarly, the upper ends of linkage arms 73 and 74 are held in place by pins 76 and 77 which are attached to piston 9, one on each side of wrist pin 81, and positioned parallel to wrist pin 81. Linkage arms 73 and 74 preferably curve inwardly toward connecting rod 42, as shown in FIG. 3, to provide additional clearance for the skirt of piston 79 as the lower end of connecting rod 42 moves from side to side. FIG. 4 shows in greater detail the curvature of the upper end of linkage arm 73. The lower end of linkage arm 73, not shown in FIG. 3, has a similar curvature.

Link pins 65, 66, 76, and 77 form the corners of a parallelogram. Linkage arms 73 and 74 form one pair of opposing sides of the parallelogram, while the piston and clamp 51 form the other, opposing sides of the parallelogram. Thus, despite the oscillatory motion of connecting rod 42, piston 79 does not rotate about wrist pin 81 because of the torque applied by follower gear 41 which is held in rotational alignment with the engine block.

Figure 6:
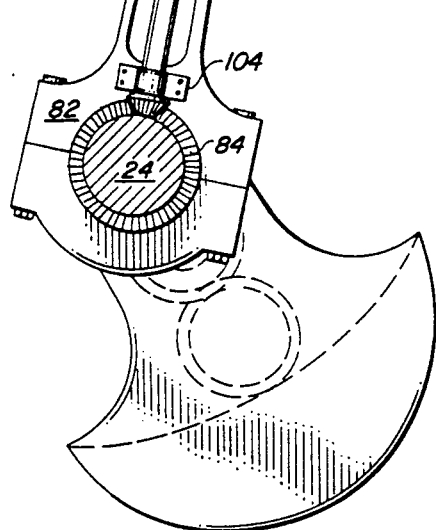
FIG. 6 illustrates a side view of a piston assembly constructed in accordance with an alternative embodiment of the invention.
Figure 7:
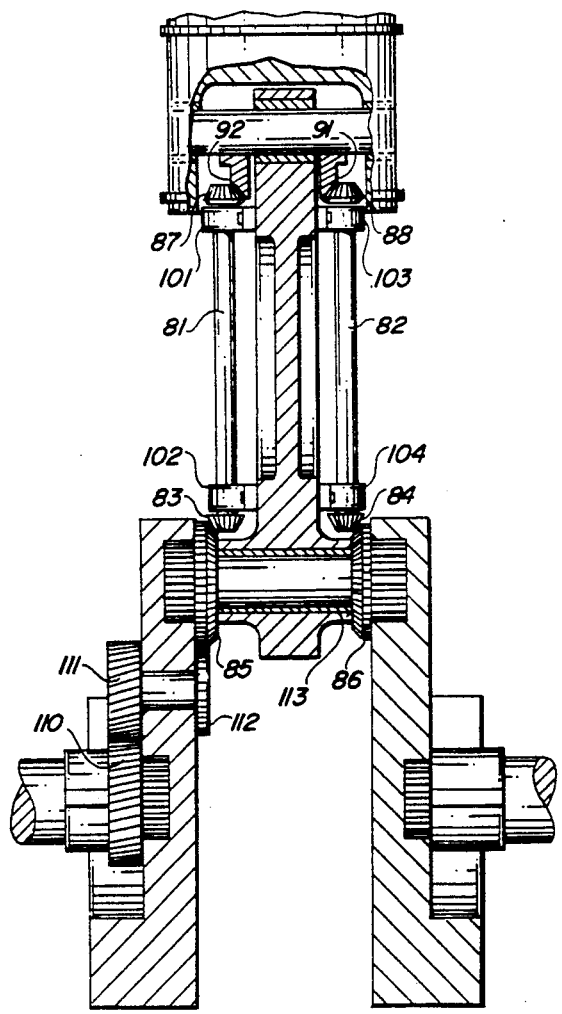
FIG. 7 is an end view of the piston assembly shown in FIG. 6.

FIGS. 6 and 7 illustrate a piston assembly constructed in accordance with an alternative embodiment of the invention in which the linkage arms are pinion shafts with a pinion gear at each end. Shafts 81 and 82 have pinion gears 83 and 84 attached to the lower ends thereof for engaging follower gears 85 and 86, respectively. Pinion gears 87 and 88 are attached to the upper ends of shafts 81 and 82 for engaging sector gears 91 and 92, respectively. Sector gears 91 and 92 are formed in the arcuate portions of member 94 which clamps wrist pin 95 to piston 96. The pinion, sector, and follower gears are preferably bevel gears.

Pinion gears 83, 84, 87, and 88 preferably have the same diameter and number of teeth, although the teeth should not be aligned with each other, i.e. a tooth of one pinion gear should be opposite a space in the pinion gear at the other end. This reduces backlash in the system. The ratio of the follower gear to its pinion gear is the same as the ratio of the sector gear to its pinion gear. Journal bearings 101 and 102 hold shaft 81 in place on connecting rod 42. Journal bearings 103 and 104 hold shaft 82 in place on connecting rod 42.

Stationary gear 110 (FIG. 7) is coupled to follower gears 85 and 86 by intermediate gears 111 and 112 and sleeve 113. The ratios of the gears is such that their product is one half. For the reasons given previously, follower gears 85 and 86 orbit but do not rotate. As connecting rod 42 swings from side to side, shafts 81 and 82 are pulled to the right or left of a vertical axis through the center of crankpin 24, causing them to rotate due to the engagement of pinion gears 83 and 84 with follower gears 85 and 86. This motion is exactly compensated by shafts 81 and 82 to pinion gears 87 and 88 which apply a correcting torque to piston 93 by way of sector gears 91 and 92.

There is thus provided by the present invention an improved means for stabilizing a piston within a cylinder. Wear due to rocking or wobbling is minimized and the time between overhauls can be extended. Further, the amount of material which must be removed to true and round the cylinder is minimized.

Having thus described the invention, it will be apparent to those of skill in the art that various modification can be made within the spirit of the invention. The linkage arms can be solid or tubular and, in the embodiment of FIGS. 2 and 3, the linkage arms can be bent at the lower end thereof to provide clearance for a straight (as opposed to a forked) connecting rod. Helical gears are preferred for smoother operation. The number of teeth per gear is a matter of design, although as large a number of teeth as reasonably possible is preferred in order to minimize the effect of backlash. The actual number of teeth depends upon a number of factors beyond this invention, e.g. the diameter of the particular gear, strength, and cost of manufacture. While a single linkage arm could be used, two are preferred to provide symmetrically applied torques.

What is claimed is:

1. In an internal combustion engine having a block within which at least one piston is attached to a crankshaft by a connecting rod between the crankpin of said crankshaft and the wrist pin of said piston, the improvement comprising:
   a fixed gear concentric with the axis of said crankshaft and coupled to said block;
   a follower gear concentric with said crankpin;
   at least one intermediate gear coupling said fixed gear to said follower gear;
   wherein the ratio of said gears is such that said follower gear orbits said fixed gear and does not rotate; and
   linkage arms interconnecting said follower gear and said piston for preventing the rotation of said piston about said wrist pin.

2. The apparatus as set forth in claim 1 wherein said linkage arms each comprise a shaft.

3. The apparatus as set forth in claim 2 wherein said piston comprises a sector gear and each linkage arm comprises a shaft having a pinion gear at each end, wherein the pinion gear at one end of each shaft engages said follower gear and the pinion gear at the other end of each shaft engages said sector gear, so that the torque on said piston is opposed by torque from said shafts acting through said sector gear.

4. The apparatus as set forth in claim 3 wherein said pinion gears are bevel gears.

5. The apparatus as set forth in claim 2 and further comprising:
   means for attaching one end of each shaft to said piston; and
   means for coupling the other end of each shaft to said follower gear;
   so that torque on said piston is opposed by torque from said shafts holding said piston in predetermined alignment with said follower gear.

6. The apparatus as set forth in claim 5 wherein said coupling means comprises:
   a pair of link pins;
   upper clamp means fitting partially around said crankpin and said link pins;
   lower clamp means fitting partially around said crankpin and said link pins;
   said upper and lower clamp means holding said link pins parallel to said crankpin;
   a sleeve surrounding said crankpin, extending from underneath said clamp means to underneath said follower gear for connecting said clamp means to said follower gear.

7. The apparatus as set forth in claim 6 and further comprising a key for mechanically coupling said follower gear and said upper and lower clamp means.

8. The apparatus as set forth in claim 7 wherein said sleeve includes a longitudinal groove in the outer surface thereof for receiving said key.

9. The apparatus as set forth in claim 5 wherein said shaft comprises a hollow member.

10. The apparatus as set forth in claim 5 wherein said shaft is a solid rod.

11. The apparatus as set forth in claim 10 wherein said shaft comprises a member having an I cross-section.

* * * * *